W. DE LHORBE.
SEAL FOR BURIAL VAULTS.
APPLICATION FILED OCT. 12, 1917.
1,281,304.
Patented Oct. 15, 1918.
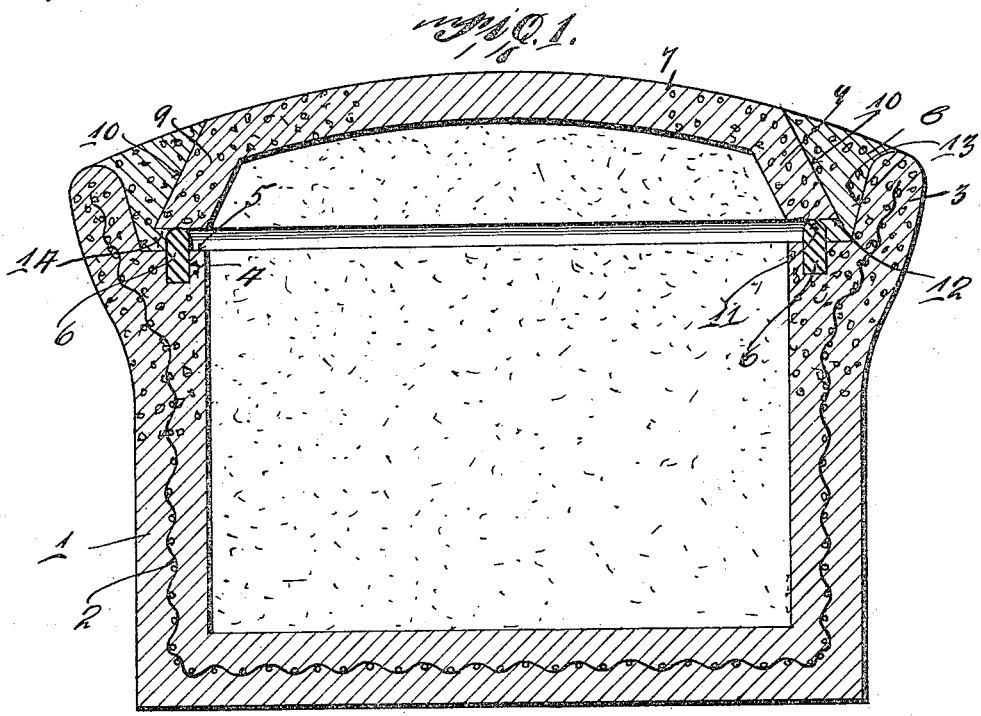
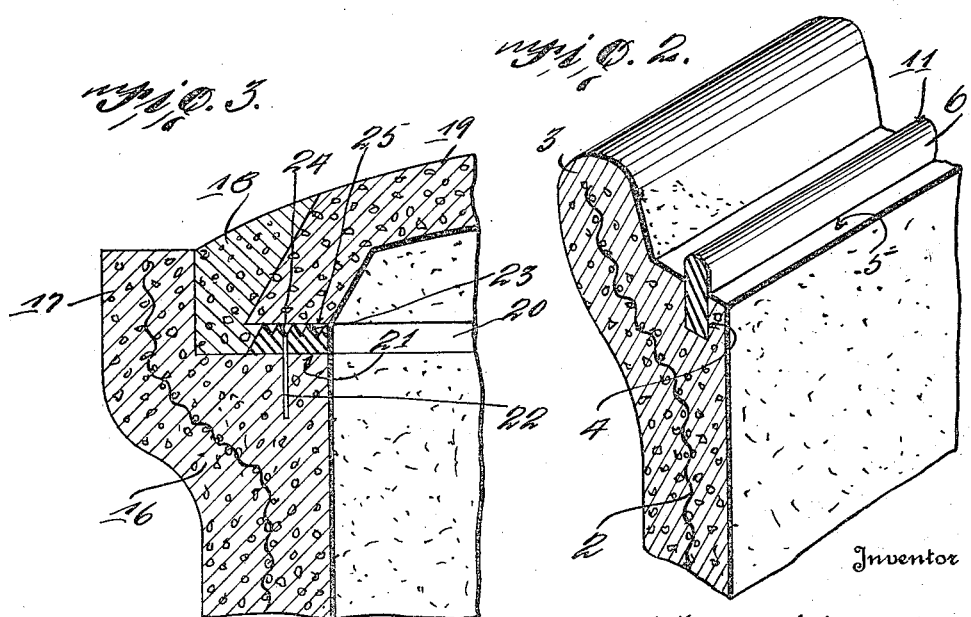
Inventor
W. DeLhorbe.
By E.E. Trooman & Co.,
his Attorneys

UNITED STATES PATENT OFFICE.

WILLIAM DE LHORBE, OF OREGON, ILLINOIS.

SEAL FOR BURIAL-VAULTS.

1,281,304.  Specification of Letters Patent.  Patented Oct. 15, 1918.

Application filed October 12, 1917. Serial No. 196,203.

*To all whom it may concern:*

Be it known that I, WILLIAM DE LHORBE, a citizen of United States of America, residing at Oregon, in the county of Ogle and State of Illinois, have invented certain new and useful Improvements in Seals for Burial-Vaults, of which the following is a specification, reference being had therein to the accompanying drawing.

This invention relates to a seal for concrete burial vaults and other similar containers and has for its object the production of a simple seal which will immediately and positively seal a container as soon as the seal is applied to the container.

Another object of this invention is the production of a seal which will temporarily seal the container while the plastic seal is being set.

With these and other objects in view this invention consists of certain novel constructions, combinations and arrangement of parts as will be hereinafter fully described and claimed.

In the drawings:

Figure 1 is a transverse section through a vault showing the improved seal formed thereon.

Fig. 2 is a sectional perspective view of the resilient seal for the casket.

Fig. 3 is a transverse sectional view of a modified form of the seal used in connection with the improved casket.

By referring to the drawings by numerals, 1 designates the body of the vault, which is formed of cement or other plastic material and is reinforced by the metallic reinforcing means 2. The body 1 is provided with an upwardly extending outwardly inclined flange 3 along its upper edge, the flange 3 being rounded upon the upper edge thereof as shown clearly in Figs. 1 and 2 of the drawings. The body 1 is provided with a groove 4 formed around the upper edge of the body 1 upon the ledge 5 thereof and a resilient sealing band or gasket 6 is placed therein. This band or gasket 6 extends above the upper face of the ledge 5 as shown in Fig. 1 and acts as a resilient support for the cover 7, thereby sealing the vault or body 1, temporarily while the plastic sealing material 8 is hardening.

The cover 7 is provided with side flanges 9 which said flanges are provided with inclined side edges 10. The lower ends of the said flanges 9 rest upon the upper edge 11 of the rubber gasket 6. The extreme lower edge 12 of these flanges 9 overhanging the edge of the rubber gasket 6 as shown clearly in Fig. 1 of the drawing. It should be understood that the rubber gasket 6 constitutes the temporary seal and owing to the shape of the inner wall 13 of the flanges 3 and the inclined side edge 10 of the flanges 9, a substantial wedge-shaped pocket will be produced into which the plastic seal 8 is placed. The overhanging edges 12 of the flanges 9 will produce the shoulder end under which the plastic material 8 is extended as shown in Fig. 1 for forming shoe 14.

By considering Fig. 1 it will be seen that the weight of the cover 7 by resting upon the gasket 6 will produce a very simple temporary seal for preventing moisture and air from seeping between the cover 7 and the gasket 6 while the plastic seal or material is hardening. After the plastic seal 8 is hardened the same will of course adhere to the faces 13 and 10 of the flanges 3 and 9 respectively. By having the shoe 14 formed under the shoulder 12 of the cover 7, the gasket 6 will not only be protected but the plastic seal 8 will also be firmly anchored in engagement with the cover 7 and the body 1.

In Fig. 3 there is shown a modified form of the invention wherein a body 16 is employed having a flange 17 which flange is engaged by the plastic seal 18 similar to the seal 8. This plastic seal 18 engages the cover 19 in the same manner in which the seal 8 engages the cover 7.

The gasket 20 is seated upon the ledge 21 and is anchored thereon by means of the pins 22. The upper edge of this gasket 20 is provided with a plurality of tapering upwardly extending ribs 24 upon which ribs 24 is adapted to rest the lower edge of the cover 19, in this manner producing an efficient temporary seal.

What I claim is:—

A receptacle comprising a body, said body provided with side flanges, a resilient seal carried by said body, a cover resting upon said resilient seal and overhanging the same, said cover provided with inclined walls, said side flanges provided with inclined walls and a plastic permanent seal placed between said inclined walls of said cover and flanges and extending under the overhanging edge of said cover.

In testimony whereof I hereunto affix my signature.

WILLIAM DE LHORBE.

Copies of this patent may be obtained for five cents each, by addressing the "Commissioner of Patents, Washington, D. C."